350-418
9/15/81    XR    4,289,119    SR

United States Patent [19]
Meyer, Sr.

[11] 4,289,119
[45] Sep. 15, 1981

[54] SOLAR COLLECTOR

[75] Inventor: Donald R. Meyer, Sr., North Haven, Conn.

[73] Assignee: Soloptics, Inc., Meriden, Conn.

[21] Appl. No.: 13,920

[22] Filed: Feb. 22, 1979

[51] Int. Cl.³ ............................................. F24J 3/02
[52] U.S. Cl. .................................... 126/440; 350/418; 126/449
[58] Field of Search .................. 350/198, 175 R, 179; 126/440, 449

[56] References Cited

U.S. PATENT DOCUMENTS

| 4,069,812 | 1/1978 | O'Neill ................................. 350/211 |
| 4,116,223 | 9/1978 | Vasilantone ........................ 126/440 |
| 4,134,393 | 1/1979 | Stark ................................... 126/440 |

FOREIGN PATENT DOCUMENTS

386721  1/1933  United Kingdom ............... 350/179

Primary Examiner—Samuel Scott
Assistant Examiner—G. Anderson
Attorney, Agent, or Firm—McCormick, Paulding & Huber

[57] ABSTRACT

A non-tracking spherical solar energy collector including a fluid lense and an absorber having an energy absorbing surface within the focal region of the lense. The minimal surface area of the absorber required for efficient solar energy collection is determined by ray tracing techniques utilizing known positions of the sun during days of winter and summer solstice.

16 Claims, 3 Drawing Figures

SOLAR COLLECTOR

BACKGROUND OF THE INVENTION

This invention relates in general to solar energy collectors and deals more particularly with an improved non-tracking solar collector of the type which utilizes lense means for concentrating solar radiation on an energy absorbing surface or the like.

Heretofore various solar collectors of non-tracking type have been provided for concentrating solar radiation. A collector of non-tracking type is usually mounted in fixed position at a predetermined angle of inclination to most effectively receive and collect solar energy throughout the year. The absorbing surface of such a collector is usually excessively large, to compensate for the varying position of the sun throughout the year. Such an arrangement is inconsistent with efficient energy exchange. As a result, a considerable amount of the energy collected may be lost through inefficient energy exchange and transmission.

Accordingly, it is the general aim of the present invention to provide an improved solar collector of the energy concentrating type wherein the surface area of the absorber is minimized for optimum energy transfer. A further aim of the invention is to provide a durable non-tracking solar collector of the energy concentrating type for maximum interception of solar radiation and low cost manufacture and installation.

SUMMARY OF THE INVENTION

In accordance with the present invention an improved non-tracking solar energy collector is provided with includes a collector body, lense means mounted in fixed position on the body, and an energy absorber carried by the body and having an energy absorbing surface disposed generally within the focal region of the lense means. The absorbing surface has a peripheral shape generally defined by the locii of the focii of the sun on the absorbing surface during the days of the summer and winter solstice when the solar energy collector is mounted in a fixed static position on the earth.

DETAILED DESCRIPTION OF PREFERRED EMBODIMENT

Figure 1:
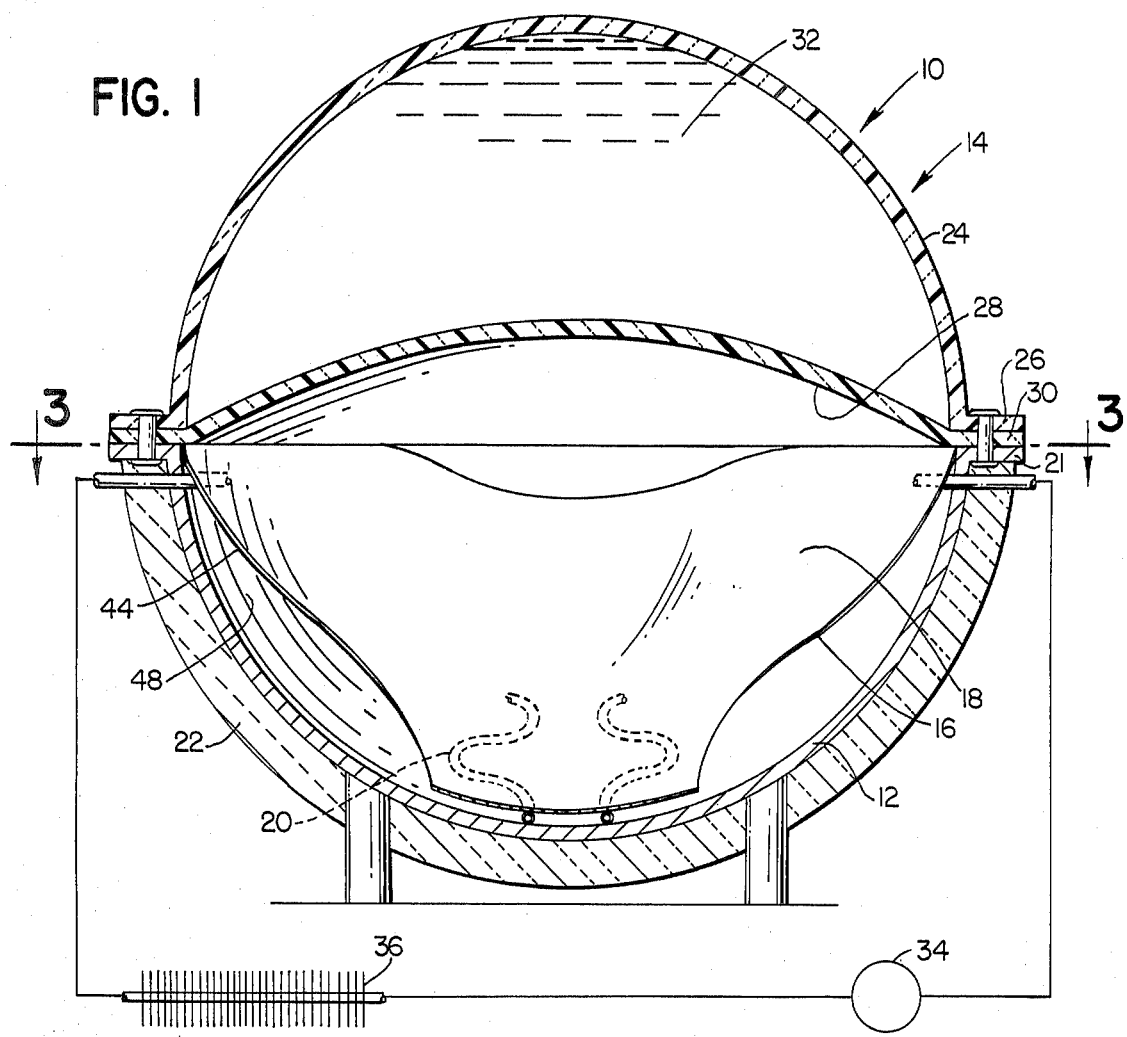
FIG. 1 is a vertical sectional view through a non-tracking solar energy collector embodying the present invention.

Turning now to the drawings, a solar energy collector embodying the present invention and shown in FIG. 1 is indicated generally by the reference numeral 10. The illustrated collector 10 is of a non-tracking type, particularly adapted for mounting in a fixed static position on the earth, and has a spherical housing which includes a collector body 12 and a lense designated generally by the numeral 14, mounted in fixed position on the body. An energy absorber 16 carried by the body has an energy absorbing surface 18 within the focal region of the lense 14. Energy transfer means, such as a fluid conduit network 20, is supported in energy exchanging relation to the absorber 16. The area of the absorbing surface 18 required for efficient energy collection and exchange is determined by ray tracing techniques utilizing known positions of the sun throughout the year, all of which will be hereinafter further discussed.

Considering now the illustrated solar collector 10 in further detail and as oriented in FIG. 1, the body 12 comprises a generally hemispherical upwardly opening shell which has a radially disposed annular flange 21 surrounding its upper end. The body 12 may be made from any suitable material. In accordance with the presently preferred practice, however, it is molded from a suitable plastic material which will withstand temperatures to which the collector 10 is subjected without distortion. The outer surface of the illustrated body shell 12 is covered by a layer of insulating material indicated at 22. The nature of the insulating material and the amount of material required will, of course, be determined primarily by the anticipated climatic conditions to which the collector is to be exposed.

The illustrated lense 14 comprises a concavo-convex lense of fluid body type which includes a generally hemispherical outer dome 24, which has a radially disposed annular flange 26, and an inner dome 28, which has a radially disposed annular flange 30. The flanges 26 and 30 are sealed together so that the inner and outer domes define a chamber 32 which contains a quantity of lense fluid. Preferably, the fluid which forms the lense body will have substantially the same index of refraction as the material from which the lense is made. However, the ambient temperatures to which the collector will be subjected will, at least to some degree, determine the characteristics of the material from which the lense is made and the fluid used as a lense body. The optical dome or fluid lense may take various optical forms and may, of course, be made from any suitable materials, however, a plastic material which may be readily molded is presently preferred for convenience and economy of manufacture. Polycarbonate, polymethelmethacrylate and acrylite plastic, for example, are appropriate material for use in making the optical dome. In accordance with presently preferred practice, however, the inner and outer domes 28 and 24 are made from Lucite or Plexiglas (refractive index; 1.41), free of absorbers for maximum energy transmission, and the lense chamber is filled with ethylene glycol (refractive index; 1.413). Other lense fluids such as petroleum distillates, silicone oils and water, may, for example, also be used. A suitable fill plug (not shown) is preferably provided to facilitate replenishment of the lense fluid, as may be required. A vapor which provides a desired index of refraction under conditions of saturation and which will not attack the dome material may also be appropriate for use as a lense body fluid. Thus, vapors such as Freons (KULENE 131-Tri-chlorfluorethane) or any other vapor that will provide a desired index of refraction compatable with a lense dome material on complete saturation without attacking the dome material should be suitable. The lense 14 is mounted on the body 12 with the lense flange 30 in sealing engagement with the body flange 21. Thus, the lense 14 forms a closure for the upper end of the hemispherical body 12.

The absorber 16 may comprise a part of the body shell 12. In the illustrated embodiment, however, the absorber 16 comprises a separate parti-spherical plate mounted in the inner surface of the body 12. The partispherical suraface 18 is formed to provide full field of focus for concentration of radiant energy on the absorber regardless of the position of the sun. The material used to make the absorber 16 preferably has a high ratio of solar absorptivity to infrared emissivity (greater than 5 and preferably near 10 or 12). The absorber may, for example, comprise an aluminum or copper substrate which has a black chrome electroplated absorbing surface. Sputtered metal carbide is also appropriate for use as a surface coating material to form a dark energy absorbing surface on the absorber 16.

The energy transfer means 18 preferably comprises a network of fluid conduit or tubing welded to the outer surface of the absorber 16 for containing a suitable heat transfer fluid. In the illustrated embodiment the tubing network 18 is disposed generally between the outer side of the absorber 16 and the inner surface of the body shell 12. The tubing network 18 is shown in FIG. 1 connected externally of the body shell 12 in a heat exchange system which includes a fluid pump 34 and a radiator 36 connected in series in a closed loop. However, it should be understood that the collector 10 is suitable for use in other types of energy collection and transfer systems, and such other arrangements are contemplated within the scope of the invention.

Figure 2:
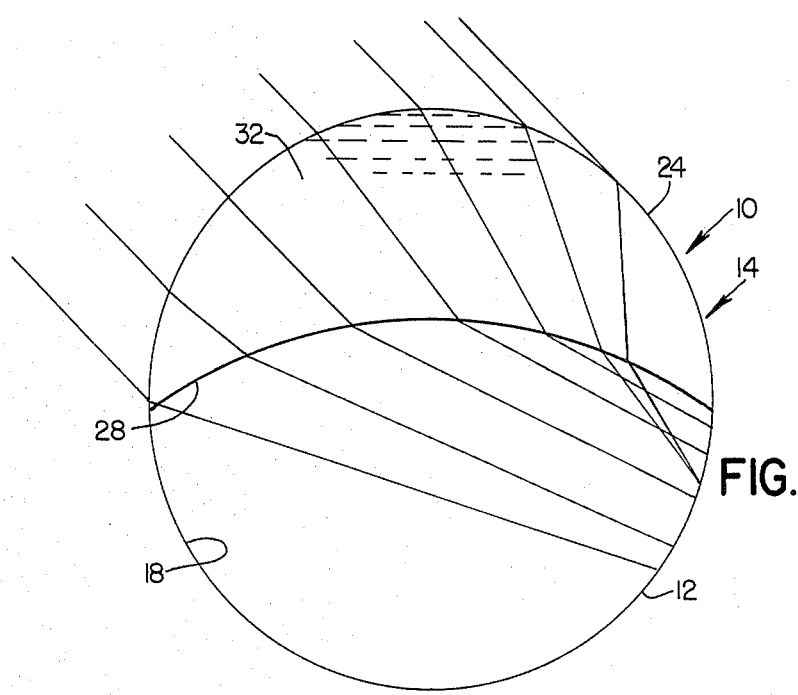
FIG. 2 is a diagramatic elevational view of the collector of FIG. 1 and shows ray tracings of oblique rays of the sun relative to the collector.

In accordance with the present invention, the peripheral shape of the absorber 16 is defined by the locii of the focii of rays of the sun on the absorber surface 18 during days of the summer and winter solstice. Typical ray tracings of direct rays of the sun which pass through the lense 14 to the absorber surface 18 are shown in FIG. 2 for an oblique angle of incidence ($\lambda=45°$). The position of the focused images on the absorber will not only vary with the angle of incidence but also with the sun hour angle (i.e. the time of day). The sun hour angle varies with the time of the day as the position of the sun changes. The angle of incidence, however, is dependent on both the time of the day and the time of the year, because the earth's orientation to the sun changes throughout the year. As the sun rises to the east of the collector in the morning, the focused image will impinge on the west side of the absorber surface 18. At solar noon the image will fall on the north-south axis of the absorber and in the evening the concentrated image will fall on the east side of the absorber.

Figure 3:
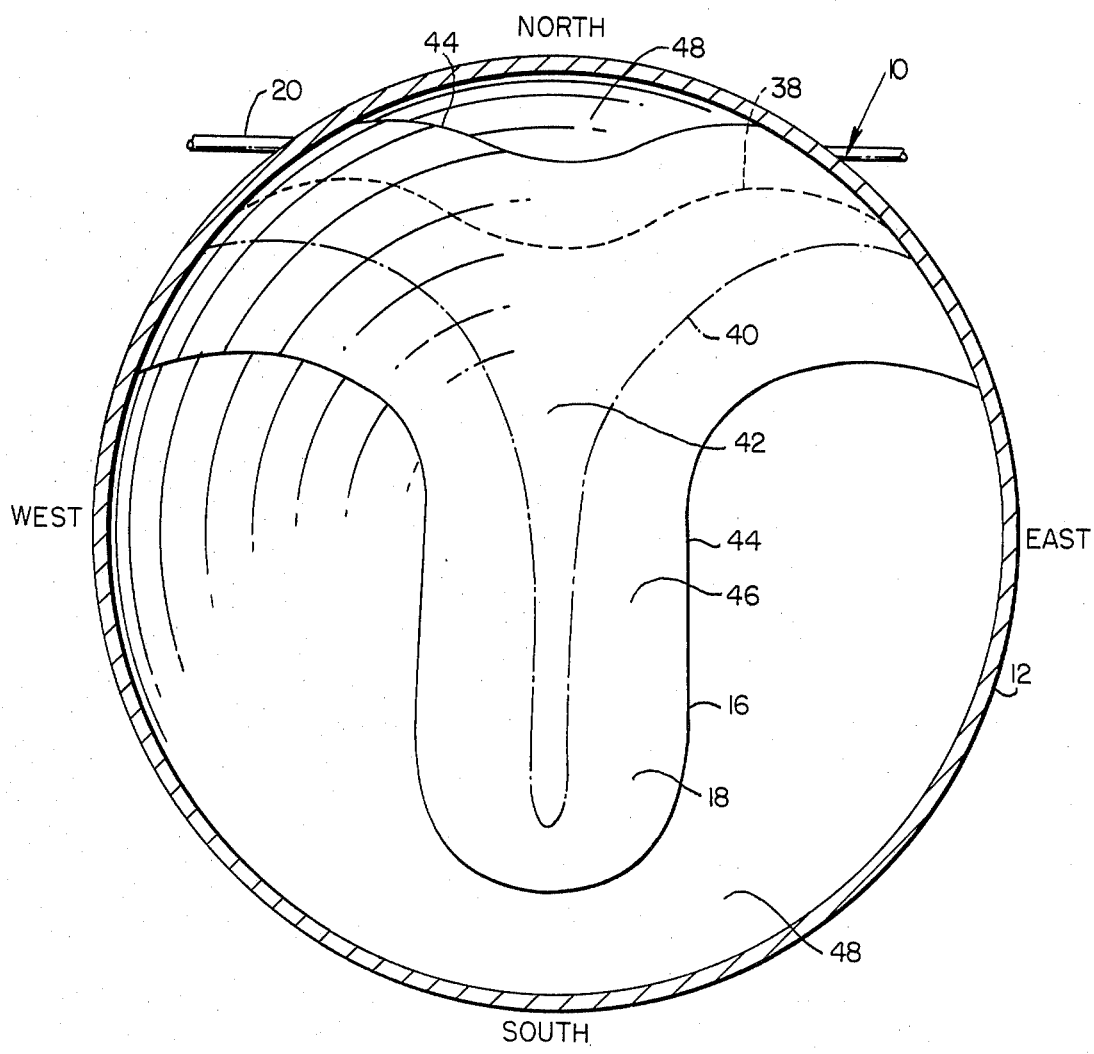
FIG. 3 is a sectional view taken along the line 3—3 of FIG. 1 and shows typical plotted paths of concentration focci as plotted during solar days of the summer and winter solstice in any latitude.

In northern latitudes in December, the time of the winter solstice, the sun rises to its lowest position in the sky, while in June, the time of the summer solstice, it rises to its highest position. Referring now to FIG. 3, the concentration focii on the absorber surface 18 is plotted for these two yearly extremes in solar orientation, the winter and summer solstice. The plot indicated by broken lines at 38 illustrates the path of the foci on the absorber surface 18, as viewed from above, during the winter solstice whereas the plot indicated by the broken lines designated by the numeral 40 represents the plotted path of the foci of the sun's rays on the absorber surface 18 during the summer solstice. The points used to generate the curves 38 and 40 are determined from angles measured in ray tracings and from angles of known positions of the sun on these two days (i.e. solar days of the winter and summer solstice). Plotted points used to generate the curves shown generally in FIG. 5 are centroids of focused images of the sun on the absorber surface 18. In the morning the focused image of the sun impinges on the west side of the absorber and moves eastward along the connecting curve as the sun moves westward. The resulting curves 38 and 40 generally enclose the entire field of solar energy concentration, indicated at 42, between December and June and determine the general peripheral shape of the absorber 16, as best shown in FIG. 3. Preferably, the absorber 16 has an outer peripheral edge 44 which is defined by the outer edge of a marginal portion 46 which has an inner boundary formed by the plotted curves 38 and 40. The width of the marginal portion is determined by size of the focused images around each centroid. The regions of the collector body inner surface beyond the peripheral edge 44 and designated by the numeral 48, 48 are not utilized for solar energy absorption. This surface area is preferably provided with a reflective surface. When the absorber body 12 is made from a plastic material, for example, the surface 48 may have a metalized coating to provide a highly reflective surface.

An indicated of the net concentrating power of the illustrated apparatus is provided by the concentration ratio (CR) defined by the formula:

$$CR = \frac{\text{Collector Surface Area}}{\text{Absorber Surface Area}}$$

wherein the Collector Surface Area is the planar area of the collector taken at Section 3—3.

The illustrated apparatus has an approximate concentration ratio of 1.5. The absorber surface area 18 is roughly 65 percent of that of a comparable flat plate collector. The concentration ratio is dependent upon the geometry of the lense. A high concentration ratio is desirable, because absorber surface area is minimized, thereby, reducing thermal losses and increasing thermal efficiency.

The most significant energy losses in the collector 10 will occur in the transmission of direct rays through the fluid medium of the lense. These transmission losses will be comprised of reflection and absorption losses. However, these losses are expected to be more than offset by the advantages gained through the unique arrangement of the absorber and the capability of the dome shaped collector lense to intercept solar radiation.

Although the invention is illustrated with reference to a spherical collector it should now be apparent that the concepts herein disclosed may also be applied to collectors of other shapes, as, for example, cylindrical collectors utilizing lense means of other optical configurations, as, for example, aspheric and such modified forms of the collector are contemplated within the scope of the invention.

In the specification the collector 10 is described as being mounted in fixed position on the earth, however, it should be understood that the collector could also be used in a moving vehicle, for example. In such instance gyroscopic or gimbal means may be employed to maintain the collector in a relatively fixed orientation to the surface of the earth and such arrangements are intended to fall within the general description "mounted in fixed position on the earth".

I claim:

1. A solar collector comprising a collector body, means securing said collector body in fixed and static position on the surface of the earth at a fixed latitudinal and longitudinal position, energy absorbing means disposed in fixed position on said collector body and having an energy absorbing surface for receiving and absorbing solar energy, lense means mounted in fixed position on said collector body for continuously focusing rays of the sun on said absorbing surface throughout the year including the solar days of the summer and winter solstice at said fixed latitudinal and longitudinal position, said absorbing surface having a peripheral shape defined by locii of centroids of the focii of said rays of the sun focused on said absorbing means by said lense means during said solar days of the summer and winter solstice as determined by the fixed and static position of said collector body at said fixed latitudinal and longitudinal position.

2. A solar energy collector as set forth in claim 1 wherein said absorbing surface has a peripheral edge defined by the outer edge of a marginal portion of said surface, said marginal portion having an inner boundary defined by said locii of said centroids of said focii.

3. A solar energy collector as set forth in either claim 1 or claim 2 wherein said lense means comprises a fluid lense.

4. A solar energy collector as set forth in claim 3 wherein said lense means and said collector body cooperate to define a housing having a chamber therein and said absorbing means is located within said chamber.

5. A solar energy collector as set forth in claim 4 wherein said housing has a generally spherical configuration.

6. A solar energy collector as set forth in claim 4 wherein said absorbing means comprises a plate mounted in fixed position within said chamber and defining said absorbing surface.

7. A solar energy collector as set forth in claim 6 wherein said energy absorbing surface defines a portion of the inner surface of said collector body and the remaining portion of said inner surface comprises an energy reflecting surface.

8. A solar energy collector as set forth in claim 3 wherein said lense comprises a shell containing a quantity of fluid and the index of refraction of the material from which said shell is made is substantially equal to the index of refraction of said fluid.

9. A solar energy collector as set forth in claim 3 wherein said lense comprises a plastic shell containing a quantity of ethylene glycol.

10. A solar collector as set forth in any one of claims 1, 2 or 3 wherein said lense means comprises a concavo-convex lense.

11. A solar energy collector as set forth in claim 3 including energy transfer means disposed in energy exchange relation with said energy absorbing surface.

12. A solar energy collector as set forth in claim 11 wherein said energy absorbing means comprises a plate defining said energy absorbing surface and said energy transfer means comprises a network of fluid conduit disposed in contact with said plate.

13. A solar collector comprising a collector body, means securing said collector body in fixed and static position on the surface of the earth at a fixed latitudinal and longitudinal position, said collector body including a generally hemispherical upwardly opening shell having a generally hemispherical inner surface, energy absorbing means disposed within said shell for receiving and absorbing solar energy and having an energy absorbing surface partially defining said hemispherical inner surface, concavo-convex lense means mounted on said collector body for continuously focusing rays of the sun on said absorbing surface throughout the year including solar days of the summer and winter solstice at said fixed latitudinal and longitudinal position, said lense means forming a closure for said upwardly opening shell, said shell and said lense means cooperating to define a chamber containing said energy absorbing means, said absorbing surface having a peripheral shape defined by locii of centroids of the focii of said rays of the sun focused on said absorbing surface by said lense means during said solar days of the summer and winter solistice as determined by the fixed and static position of said collector body at said fixed latitudinal and longitudinal position.

14. A solar collector as set forth in claim 13 wherein said concavo-convex lense means comprises a fluid lense including a lense shell and a quantity of fluid contained within said shell.

15. A solar energy collector as set forth in claim 14 wherein said fluid has an index of refraction substantially equal to the index of refraction of said lense shell.

16. A solar energy collector as set forth in any one of claims 13 through 15 wherein said absorbing means comprises a parti-spherical plate mounted within said chamber.

* * * * *